United States Patent [19]

Sawa et al.

[11] Patent Number: 4,732,497
[45] Date of Patent: Mar. 22, 1988

[54] BEARING DEVICE

[75] Inventors: Shiro Sawa; Yoshihide Toda; Kenichi Horii; Katsuhiko Ikeda, all of Osaka, Japan

[73] Assignee: Koyo Seiko Co., Ltd., Osaka, Japan

[21] Appl. No.: 917,551

[22] Filed: Oct. 10, 1986

[51] Int. Cl.⁴ .............................................. F16C 19/38
[52] U.S. Cl. .................................... 384/585; 384/540; 384/571; 384/563
[58] Field of Search ............... 384/563, 571, 585, 517, 384/540, 542

[56] References Cited

U.S. PATENT DOCUMENTS

| | | | |
|---|---|---|---|
| 1,976,613 | 10/1934 | Herrmann | 384/571 |
| 3,890,015 | 6/1975 | Harbottle | 384/571 |
| 4,602,876 | 7/1986 | Miki et al. | 384/585 |

Primary Examiner—Lenard A. Footland
Attorney, Agent, or Firm—Finnegan, Henderson, Farabow, Garrett & Dunner

[57] ABSTRACT

A bearing device for an axle comprises a housing arranged about a portion of the axle, a pair of bearings each having a predetermined clearance mounted between the housing and the axle for rotation of the axle with respect to the housing; two opposed offset pairs of corresponding steps, including a first step of each pair on the outer periphery of the axle, and a second step of each pair on the inner periphery of the housing for positioning the bearings on the axle in the axial direction; and a clamping device for securing the bearings against axial movement on the axle beyond the predetermined clearance.

1 Claim, 3 Drawing Figures

BEARING DEVICE

BACKGROUND OF THE INVENTION

This invention relates to a bearing device, such as a bearing device for a vehicular wheel hub, for supporting the ends of an axle in two places, on the front end and sides thereof. More particularly, the invention relates to a bearing device of the type in which two bearings, each having a predetermined positive or negative interior clearance, are clamped and fixed in the axial direction by nuts and bolts. Angular contact roller bearings, i.e., conical roller bearings and angular contact ball bearings (hereinafter collectively called "angular contact rolling bearings") preferably are used as the two bearings for supporting the ends of the axle.

U.S. Pat. No. 4,336,641 discloses a bearing device of the type described above. FIG. 1 shows the construction of a bearing device of the type disclosed in this patent. An axle member S has a peripheral stepped portions S' on the outer periphery thereof. A housing H has peripheral stepped portions H', H" in two places on the inner periphery thereof, and two conical roller bearings B1, B2 are installed between the axle S and the housing H. The bearing B1 has an edge face on the large diameter side of an inner ring B1a. The edge face abuts a radial flat portion 51 of the peripheral stepped portion S' of the axle member S. An edge face on the large diameter side of an outer ring B1b abuts against a radial flat portion 53 of one peripheral stepped portion H' of the housing H. The bearings B1 and B2 are mounted in between the axle member S and the housing H. The bearing B2 has an outer ring B2b which abuts against a radial flat portion 54 of the other peripheral stepped portion H" of the housing.

The inner ring B2a of the bearing B2 loosely mates with the front end of the axle member S. A bolt D presses a holding plate C against an edge face on the large diameter side of the inner ring B2a. This causes the inner ring B2a to displace in the axial direction, so that both of the bearings B1 and B2 are supplied with a predetermined positive or negative interior clearance, and are fixed in the axial direction. A spacer E is inserted between the edge face at the front end of the axle member S and the holding plate C to provide the bearing with a proper clearance. The amount of the clearance may be adjusted by replacing the spacer.

To adjust the amount of the clearance by replacing the spacer E, it is necessary to try a number of spacers of different thicknesses, one after another. This adjustment is time consuming, and requires skilled efforts. Moreover, if this adjustment is made too frequently, the spacer or the threads of the bolt may be damaged, and foreign substances may become lodged in the portion where the spacer is inserted.

Another method disclosed in U.S. Pat. No. 3,326,613 eliminates the need for the holding plate. In this structure, the outer periphery at the front end of the axle member has a threaded portion therein. A nut is screwed directly into the threaded port to press an inner ring against a bearing having a predetermined interior clearance. In this case, however, the clamping pressure of the nut is not adjustable. A spring member must be inserted between the nut and the bearing, or a special spacer must be used. Thus, these adjustment techniques become more complicated as the number of parts increases, or special parts are required.

SUMMARY OF THE INVENTION

The present invention is intended to remedy the shortcomings in the prior art, and it is therefore an object of the invention to provide a bearing device with a readily adjustable interior clearance.

It is another object of the invention to simplify the adjustment of the clearance of a bearing device, by eliminating the need for the use of spacers or springs.

A further object of the invention is to firmly secure a pair of bearings in a place on an axle while readily maintaining the predetermined clearance of the bearings.

Additional objects and advantages of the invention will be set forth in part in the description which follows, and in part will be obvious from the description, or may be learned by practice of the invention.

To achieve the foregoing objects and advantages, and in accordance with the purpose of the invention, as embodied and broadly described herein, the bearing device of the present invention comprises a housing arranged about a portion of the axle; a pair of bearings each having a predetermined clearance mounted between the housing and the axle for rotation of the axle with respect to the housing; offset stepped means on the outer periphery of the axle and the inner periphery of the housing for positioning the bearings on the axle in the axial direction; and clamping means for securing the bearing against axial movement on the axle beyond the predetermined clearance.

Preferably, the offset stepped means includes two opposed pairs of corresponding steps, including a first step of each pair on the outer periphery of the axle, and a second step of each pair on the inner periphery of the housing, the pairs of corresponding steps generally defining an exterior and an interior bearing space, respectively. It is also preferred that each of the bearings include inner ring means for abutting against a corresponding first step and outer ring means for abutting against a corresponding second step when the clamping means is tightened. Each of the bearings preferably also includes an angular contact roller bearing nested in one of the bearing spaces between the inner ring means and the outer ring means, the exterior and interior bearing spaces being offset from each other in the axial direction.

It is preferred that the clamping means include screw threads on a portion of the axle and a corresponding nut for attachment to the threads for tightening against the inner ring means. At least one of the angular contact bearings preferably is a conical roller bearing, or an angular contact ball bearing. The inner ring means may include a pair of inner rings and the outer ring means may include a corresponding pair of outer rings, the inner rings each including a cutout portion for defining the predetermined clearance of the bearing, one pair of opposed inner and outer rings being disposed in each of the exterior and interior bearing spaces.

BRIEF DESCRIPTION OF THE DRAWINGS

The accompanying drawings, which are incorporated in and constitute a part of this specification, illustrate one embodiment of the invention and, together with the description, serve to explain the principles of the invention.

In the drawings.

DETAILED DESCRIPTION OF THE INVENTION

Reference will now be made in detail to the present preferred embodiment of the invention, an example of which is illustrated in the accompanying drawings.

The bearing device for an axle of the present invention comprises a housing arranged about a portion of the axle; and a pair of bearings each having a predetermined clearance mounted between the housing and the axle for rotation of the axle with respect to the housing. Offset stepped means are provided on the outer periphery of the axle and the inner periphery of the housing for positioning the bearings on the axle in the axial direction. Clamping means secure the bearings against axial movement on the axle beyond the predetermined clearance. The offset stepped means includes two opposed pairs of corresponding steps. A first step of each pair lies on the outer periphery of the axle, and a second step of each pair is positioned on the inner periphery of the housing. The pairs of corresponding steps generally define an exterior and an interior bearing space, respectively. In accordance with the invention, each of the bearings includes inner ring means for abutting against a corresponding first step and outer ring means for abutting against a corresponding second step when the clamping means is tightened, and each of the bearings also includes an angular contact roller bearing nested in one of the bearing spaces between the inner ring means and the outer ring means. The exterior and interior bearing spaces are offset from each other in the axial direction. The clamping means typically includes screw threads on a portion of the axle, and a corresponding nut for attachment to the threads for tightening against the inner ring means.

The inner ring means includes a pair of inner rings and the outer ring means includes a corresponding pair of outer rings. The inner rings each include a cutout portion for defining the predetermined clearance of the bearing. One pair of opposed inner and outer rings is disposed in each of the exterior and interior bearing spaces.

Figure 1:
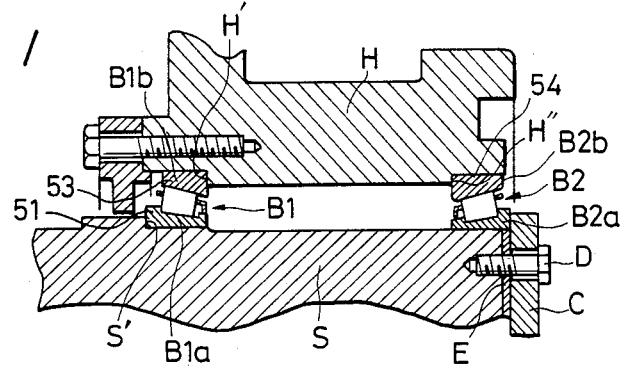
FIG. 1 is a vertical sectional view of a conventional bearing device.
Figure 2:
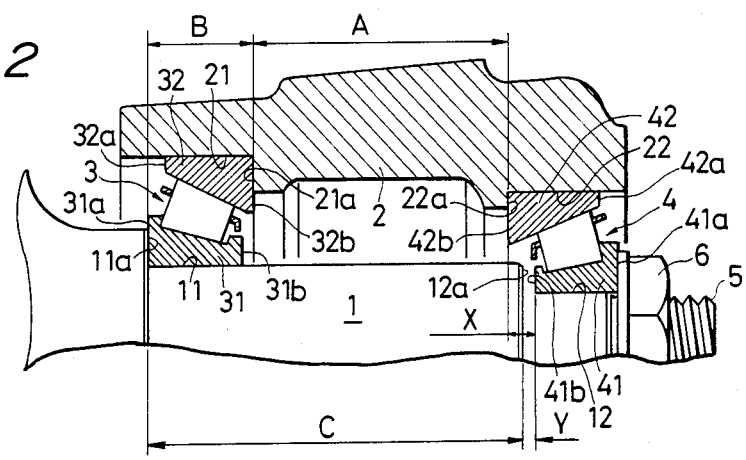
FIGS. 2, 3 are vertical sectional views of bearing devices embodying the present invention.
Figure 3:
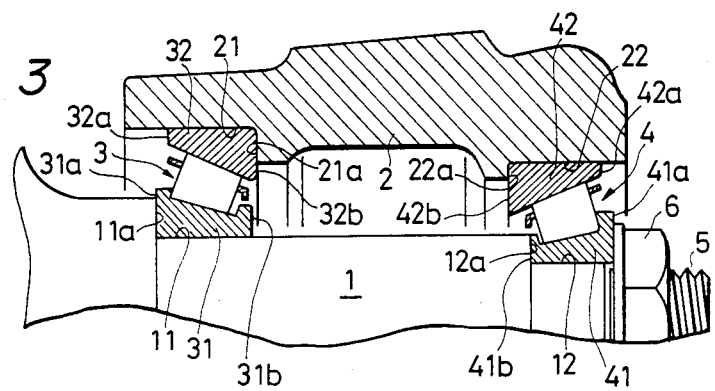

FIGS. 2, 3 shows embodiments of the present invention. As here embodied, an axle member 1 shown therein has two peripheral stepped portions 11, 12 extending from the joint of the axle toward the front end on the outer periphery thereof. A housing 2 has two peripheral stepped portions 21, 22 on the inner periphery thereof. Angular contact rolling bearings 3, 4 (angular contact roller bearings, i.e., conical roller bearings are used in this embodiment) are installed in such a manner as to make the axle member 1 and the housing 2 rotatable with respect to one another. The bearing 3, has an edge face 31a on the large diameter side of an inner ring 31 which abuts against a radial flat portion 11a of peripheral stepped portion 11 of the axle member 1. An edge face 32b on the small diameter side of an outer ring 32 abuts against a radial flat portion 21a of peripheral stepped portion 21 of the housing 2. The bearing 3 is mounted between the axle member 1 and the housing 2. The bearing 4 has an edge face 41b on the small diameter side of an inner ring 41 which faces a radial flat portion 12a of peripheral stepped portion 12 of the axle member 1. An edge face 42b of bearing 4 on the small diameter side of an outer ring 42 abuts against a radial flat portion 22a of peripheral stepped portion 22 of the housing 2. The bearing 4 is also mounted between the axle member 1 and the housing 2. A nut 6 is screwed onto a threaded portion 5 on the outer peripheral face at the end of the axle member 1. When tightened, the nut 6 fixes both the bearings 3 and 4 in the axial direction so that they have a predetermined positive or negative interior clearance.

The following relationships are utilized to describe the dimensioning of the narrow components of the bearing device.

The axial distance between the radial peripheral stepped portions 21 and 22 of the housing 2 is referred to as A. The axial distance between the edge face 32b on the small diameter side of the outer ring 32 of the bearing 3 and the edge face on the large diameter side of the inner ring 31, thereof when the bearing is mounted (also called the "built-in breadth") is referred to as B. The axial distance between the radial flat portions 11a and 12a is referred as C. The axial projection of the edge face 42b on the small diameter side of the outer ring of the bearing 4 relative to the edge face 41b on the small diameter side of the inner ring (also called the "difference breadth") is referred to as X.

The amount of axial clearance between the radial flat portion 12a of the peripheral stepped portion 12 and the opposite edge face 41b on the small diameter side of the inner ring 41 of the bearing 4 is referred to as Y.

The axial displacement of the inner ring 41 when the bearing has a predetermined interior clearance is referred to as Z.

Given the above demensions, the relationships among the axle member 1, the housing 2 and the bearings 3 and 4 are determined to satisfy the equations $$Y=Z \text{ and } A+B+X=C+Y$$

The relationship defined above allows the inner ring 41 of the bearing 4 to move by the displacement Z in the axial direction when the nut 6 in FIG. 2 is tightened, and provides the bearings 3 and 4 with the predetermined interior clearance shows in FIG. 3 when the radial edge face 41b on the small diameter side of the inner ring 41 abuts against the radial flat portion 12a of the peripheral stepped portion 12 of the axle member 1.

Of the above dimensions, the values of the axial space A, the built-in breadth B and the difference breadth X are predetermined when the bearing device is manufactured. The predetermined clearance inside the bearings is preset within a fixed range, e.g. the range of 200 kg~400 kg pilot pressure load for a vehicular device. By determining the axial displacement (i.e., Z) of the bearing for the above range of pilot pressure load beforehand for the bearing, the proper axial clearance Y can be obtained.

The remaining value of the axial space C automatically is obtainable by applying the values of A, B, X, Y, to the above equation.

What should be taken into consideration in that case is that tolerances during machining have been incorporated in the above values A, B, C, X, and therefore they already should be set properly. As set forth above, however, a suitable interior clearance falls within a fixed range, and consequently, the tolerances of A, B, C, X should be determined by obtaining the upper and lower limit values of Z within the fixed range and conforming the upper and lower limit values of the axial clearance to those of Z.

Although conical roller bearings are used as the angular contact rolling bearing in the above embodiment, such conical roller bearings need not always be used, but may be replaced with, e.g., angular contact ball bearings. Any bearing device which employs two angular contact rolling bearings having a predetermined interior clearance may be used. For example, a conical roller bearing and an angular contact ball bearing may be used in combination. As for the press or clamping means, a holding plate of the type disclosed by U.S. Pat. No. 4,336,641 and cited as the prior art, may be used in place of the nut member referred to in the above embodiment.

In the bearing device thus constructed, the bearings quickly and easily are provided with a predetermined positive or negative interior clearance only by tightening the nut member until the inner ring of the bearing abuts against the peripheral stepped portion of the axle member. As a result, it is unnecessary repeatedly to replace a spacer for adjusting the clearance in the bearings, thus greatly simplifying adjustment. Since no particular skill is required for the clearance adjustment, more accurate clearance setting can be made. Also the reliability of the device is improved, because the failures due to an excessively large or small clearance are reduced. The interior clearance of the bearings is unchangeable even if the nut member is increasingly tightened beyond the point where the inner ring of the bearing abuts against the peripheral stepped portion of the axle member. Accordingly, the need for a locking stopper (such as a double nut, split pin or the like) can be eliminated because the clamping pressure of the nut is variable. Moreover, the number of parts is decreased because there is no need for a spring member or a special spacer for adjusting the clearance. Obviously, many modifications and variations of the present invention are possible in light of the above. It is, therefore, to be understood that within the scope of the appended claims, the invention may be practiced in ways other than as specifically described herein.

What is claimed is:

1. An apparatus for rotatably supporting the end of an axle in two places by a first angular contact roller bearing and an opposed second angular contact roller bearing, each of which has an inner ring and an outer ring, comprising:

an axle having an outer periphery;

a housing having an inner periphery arranged about a portion of said axle;

said inner periphery of said housing and said outer periphery of said axle defining an inner bearing space and an outer bearing;

said inner bearing space having the first angular contact roller bearing disposed therein and having a first step on said outer periphery of said axle and a second step, opposed to said first step, on said inner periphery of said housing;

an outer bearing space, axially spaced from said inner bearing space, having the second angular contact roller bearing disposed therein and having a first step on the outer periphery of said axle and a seocnd step opposed to said first step, on the inner periphery of said housing;

said first step corresponding to said outer bearing space extending radially inwardly from said first step corresponding to said inner bearing space;

the outer ring of said first angular contact roller bearing having an edge face for abutting against said second step corresponding to said inner bearing space;

the inner ring of said first angular contact roller bearing having an edge face for abutting against said first step corresponding to said inner bearing space;

the outer ring of said second angular contact roller bearing having an edge face for abutting against said second step corresponding to said outer bearing space;

the inner ring of said second angular contact roller bearing having an edge face for abutting against said first step corresponding to said outer bearing space; and nut means in threaded engagement with the outer periphery of said axle, operable to force said inner ring of said conical bearing into engagement with said second first step corresponding to said outer bearing space so that the following relationship is satisfied:

$$A+B+X=C+Y$$

where:
   $A$ = the axial distance between said second step of said inner bearing space and said second step of said outer bearing space;

$B$ = the axial distance between said first and second steps of said inner bearing space;

$C$ = the axial distance between said first step of said inner bearing space and said first step of said outer bearing space;

$X$ = the distance between said abutting portion of said outer ring of said second roller bearing and said first step of said outer bearing space; and $Y$ = the distance between said abutting portion of said inner ring of said second angular contact roller bearing and said first step of the outer bearing space.

* * * * *